US012654605B2

(12) United States Patent
Özkiliç Usal

(10) Patent No.: US 12,654,605 B2
(45) Date of Patent: Jun. 16, 2026

(54) LATERAL ISOLATOR FOR VEHICLE SEATS

(71) Applicant: PILOT TAŞIT KOLTUKLARI SANAYI VE TICARET ANONIM ŞIRKETI, Bursa (TR)

(72) Inventor: Merve Özkiliç Usal, Bursa (TR)

( * ) Notice: Subject to any disclaimer, the term of this patent is extended or adjusted under 35 U.S.C. 154(b) by 251 days.

(21) Appl. No.: 18/561,034

(22) PCT Filed: Dec. 27, 2022

(86) PCT No.: PCT/TR2022/051611
§ 371 (c)(1),
(2) Date: Nov. 15, 2023

(87) PCT Pub. No.: WO2024/144466
PCT Pub. Date: Jul. 4, 2024

(65) Prior Publication Data
US 2025/0091490 A1 Mar. 20, 2025

(51) Int. Cl.
*B60N 2/50* (2006.01)

(52) U.S. Cl.
CPC .................................... *B60N 2/502* (2013.01)

(58) Field of Classification Search
CPC B60N 2/502; B60N 2002/0212; B60N 2/509; B60N 2/522; B60N 2/544
USPC .................. 367/131; 248/429, 419, 424, 657
See application file for complete search history.

(56) References Cited

U.S. PATENT DOCUMENTS 4,626,018 A 12/1986 Massey
5,048,886 A * 9/1991 Ito ....................... B60N 2/02246
296/65.14

5,447,352 A * 9/1995 Ito .......................... B60N 2/075
296/65.14
7,325,851 B2 * 2/2008 Ito .......................... B60N 2/067
296/65.13
7,328,877 B2 * 2/2008 Yamada ............... B60N 2/0715
297/344.1
7,669,824 B2 * 3/2010 Woehrle ................. B60N 2/067
248/419
8,016,258 B1 * 9/2011 Boyarski ............... B60N 2/502
248/576
8,215,602 B2 * 7/2012 Walter ................. B60N 2/0818
296/65.13
8,439,324 B2 * 5/2013 Hake .................. B60N 2/02246
248/424

(Continued)

FOREIGN PATENT DOCUMENTS

CN 106740315 A 5/2017
JP 2012076496 A 4/2012
TR 2016/00669 A1 1/2016

OTHER PUBLICATIONS

International Search Report and Written Opinion of the International Searching Authorityfor corresponding PCT/TR2022/051611 dated Sep. 12, 2023.

*Primary Examiner* — Muhammad Ijaz

(74) *Attorney, Agent, or Firm* — EGBERT, MCDANIEL & SWARTZ, PLLC

(57) ABSTRACT

Disclosed is a lateral isolator for use in vehicle seats. In particular, disclosed is a lateral isolator for seats used in heavy machinery and vehicles to ensure that the driver is minimally affected by road conditions on rough roads or in difficult operating conditions.

4 Claims, 3 Drawing Sheets

(56)                References Cited

U.S. PATENT DOCUMENTS

| | | | | |
|---|---|---|---|---|
| 8,453,529 | B2 * | 6/2013 | Birker | B60N 2/067 |
| | | | | 74/424.74 |
| 8,757,577 | B2 * | 6/2014 | Naoki | B60N 2/0887 |
| | | | | 297/344.1 |
| 8,763,978 | B2 * | 7/2014 | Newman | F24S 25/33 |
| | | | | 248/500 |
| 11,034,264 | B2 * | 6/2021 | Ferenc | B60N 2/0715 |
| 11,708,011 | B2 * | 7/2023 | Carroll | B60N 2/0705 |
| | | | | 248/429 |
| 12,122,265 | B2 * | 10/2024 | Xiao | B60N 2/073 |
| 2004/0118990 | A1 * | 6/2004 | Yokoi | B60N 2/0818 |
| | | | | 248/424 |
| 2004/0144906 | A1 * | 7/2004 | Hill | B60N 2/502 |
| | | | | 248/421 |
| 2006/0249644 | A1 * | 11/2006 | Folliot | F16H 25/20 |
| | | | | 248/429 |
| 2006/0279120 | A1 * | 12/2006 | Fujita | B60N 2/7058 |
| | | | | 297/284.2 |
| 2008/0048087 | A1 * | 2/2008 | Kojima | B60N 2/0818 |
| | | | | 248/429 |
| 2010/0133408 | A1 * | 6/2010 | Umezaki | B60N 2/067 |
| | | | | 248/429 |
| 2011/0315847 | A1 * | 12/2011 | Simms | B60N 2/0806 |
| | | | | 248/429 |
| 2012/0145867 | A1 * | 6/2012 | Benthien | B60N 2/072 |
| | | | | 248/429 |
| 2012/0205511 | A1 * | 8/2012 | Hofmann | B60N 2/0722 |
| | | | | 72/46 |
| 2013/0119221 | A1 * | 5/2013 | Hayashi | B60N 2/07 |
| | | | | 248/429 |
| 2013/0153735 | A1 * | 6/2013 | Ruthman | B60N 2/0705 |
| | | | | 248/429 |
| 2013/0264454 | A1 * | 10/2013 | Hayashi | B60N 2/0875 |
| | | | | 248/429 |
| 2014/0110553 | A1 * | 4/2014 | Hoshihara | B60N 2/0727 |
| | | | | 248/429 |
| 2014/0175249 | A1 * | 6/2014 | Becker | B21D 22/02 |
| | | | | 72/389.1 |
| 2014/0238188 | A1 * | 8/2014 | Ito | B60N 2/0296 |
| | | | | 74/664 |
| 2014/0374562 | A1 * | 12/2014 | Masuda | B60N 2/0705 |
| | | | | 248/429 |
| 2015/0130251 | A1 * | 5/2015 | Kondo | B60N 2/544 |
| | | | | 297/451.3 |
| 2015/0360587 | A1 * | 12/2015 | Hoffmann | B60N 2/02246 |
| | | | | 74/89.14 |
| 2015/0367756 | A1 * | 12/2015 | Katoh | B60N 2/544 |
| | | | | 297/285 |
| 2016/0075259 | A1 * | 3/2016 | Couasnon | B60N 2/0705 |
| | | | | 297/344.1 |
| 2016/0114703 | A1 * | 4/2016 | Fujita | B60N 2/1615 |
| | | | | 248/550 |
| 2023/0219472 | A1 * | 7/2023 | Lorey | B60N 2/666 |
| | | | | 248/562 |
| 2023/0256872 | A1 * | 8/2023 | Kuroda | B60N 2/0818 |
| | | | | 248/429 |
| 2023/0294564 | A1 * | 9/2023 | Zhao | B60N 2/0224 |
| | | | | 248/429 |

* cited by examiner

LATERAL ISOLATOR FOR VEHICLE SEATS

TECHNICAL FIELD

The invention relates to a lateral insulator for use in vehicle seats.

In particular, the invention relates to a lateral insulator for seats used in heavy machinery and vehicles to ensure that the driver is minimally affected by road conditions on rough roads or in difficult operating conditions.

STATE OF THE ART

Vehicle drivers are at high risk of discomfort from prolonged sitting and vehicle vibration.

In current applications, especially in the seats used in heavy machinery, no system is used to prevent the reflection of the uneven road condition and the movement in the working conditions on the driver. For this reason, every movement on the road is directly transmitted to the driver and it is not possible to ensure driving comfort. Due to poor road conditions in the conditions of use of heavy machinery, disorders in the body postures and positions of the drivers can be observed and various health problems may occur. It is also important for the vehicle driver to sit in the correct vehicle driving position and to exhibit movements in accordance with ergonomics in order not to lose workforce.

As a result of the research on the subject, a utility model application with the number TR2016/00669 titled "Shock absorbing personnel seat" was found. The related application comprises a seat, seat carrier platform, seat carrier car, rear support plate for armrest carriers, armrest carrier right, armrest carrier left, armrest body, armrest, armrest centre screw, armrest angle adjustment lever, stepped angle adjustment slots, hardware mounting platform, carrier platform, leg support pipe, mounting shaft, locking pin, gas springs, rail profile, support bracket, h type support bracket, rail profile rear cover, rail profile top cover, support bracket screw/nut, seat carrier platform screw/nut, suspension, valve, wheel.

As a result, due to the above-mentioned disadvantages and the inadequacy of the existing solutions, a development in the related technical field has become necessary.

OBJECT OF THE INVENTION

The invention is inspired by the present situations and aims to solve the above-mentioned problems.

The main object of the invention is to provide driver comfort and ergonomics so that the driver is minimally affected by the road condition.

Another object of the invention is to provide a flexing mechanism which can be activated or deactivated according to the conditions of use at the request of the driver.

Another object of the invention is to minimise the discomfort caused by prolonged sitting position and vehicle vibration in drivers.

Another object of the invention is to increase the working efficiency of the driver by sitting in the correct driving position and exhibiting movements in accordance with ergonomics.

The invention is a lateral insulator used by mounting between the seat bench and the seat suspension system in vehicles to fulfil the purposes described above that comprises the following:

lower rails mounted horizontally and parallel to each other on the seat suspension system, upper rails mounted horizontally and parallel to each other at the base of the seat bench, movable linearly on the lower rail, rail bars positioned between the lower rails and the upper rails to enable the lower rails and the upper rails to move linearly on each other, at least one rolling element positioned between the lower rails and the upper rails to reduce the friction generated during the movement of the lower rails and the upper rails on each other and to enable the rails to move on each other, a shock absorber positioned between the lower rail and the upper rail to limit and stabilise movement between the lower rail and the upper rail, two springs positioned between the lower rail and the upper rail to limit and stabilise the movement between the lower rail and the upper rail, a balance apparatus positioned one between the springs for connecting the springs to the lower rail and for stabilising the movement of the rails.

The structural and characteristic features and all advantages of the invention are more clearly understood by means of the figures given below and the detailed description written by making references to these figures, and therefore the evaluation should be made by considering these figures and the detailed description.

FIGURES TO HELP UNDERSTANDING THE INVENTION

DESCRIPTION OF PART REFERENCES

Figure 1:
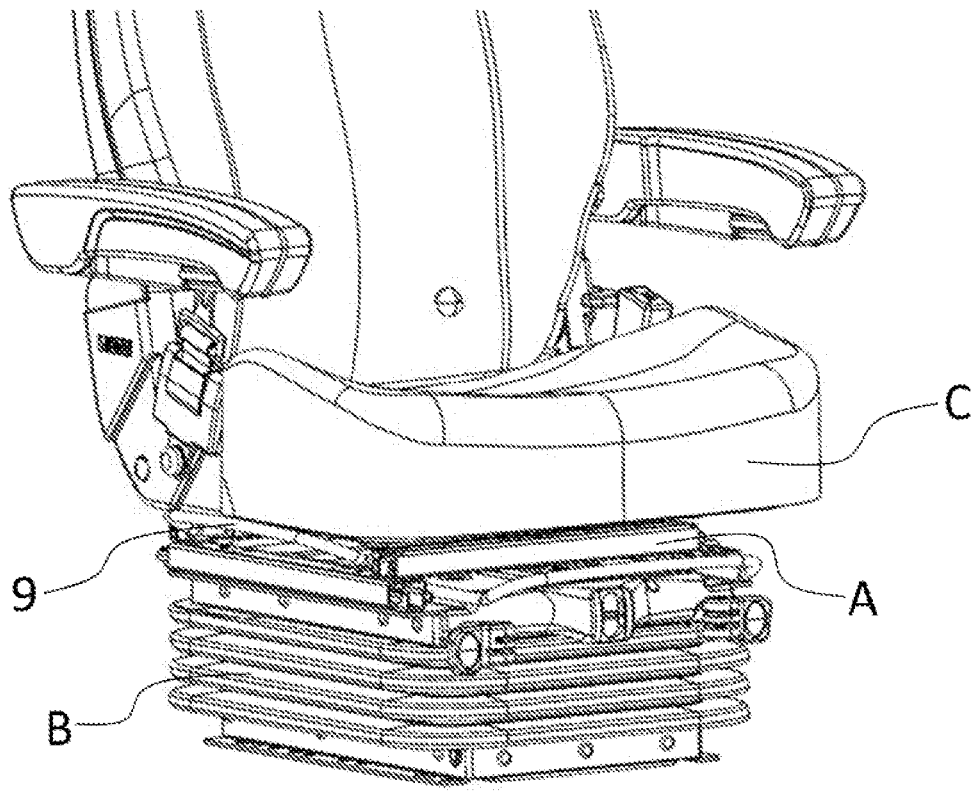
FIG. 1 is a perspective view showing the position where the lateral insulator of the invention is mounted on a seat system.
Figure 2:
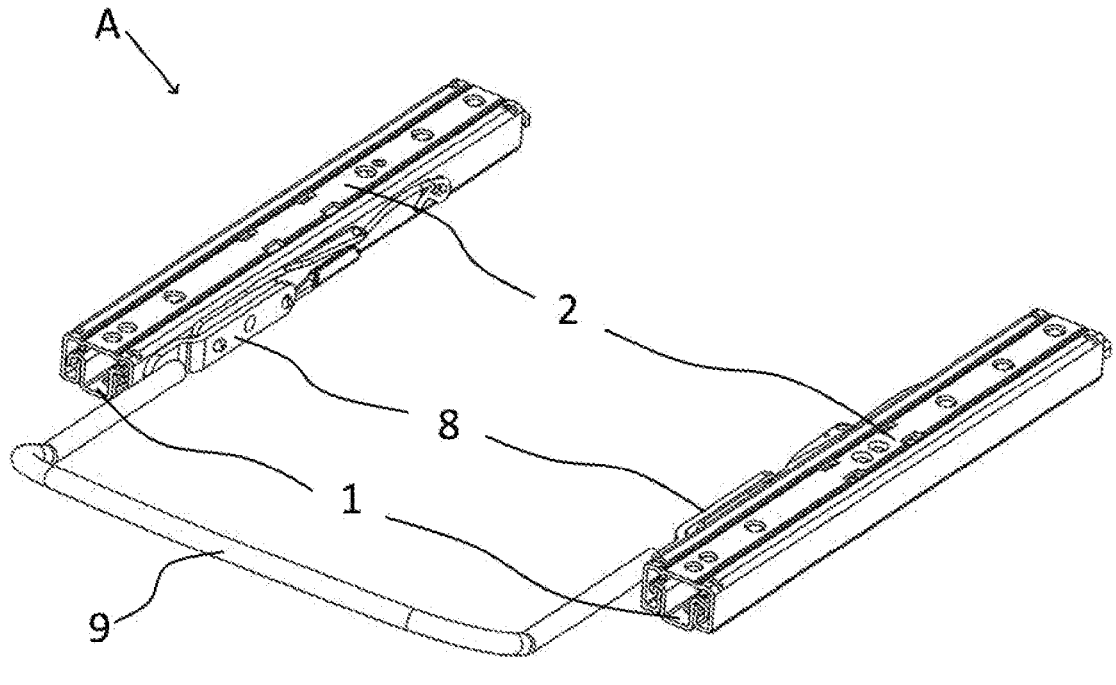
FIG. 2 is a perspective view of the lateral insulator of the invention.
Figure 3:
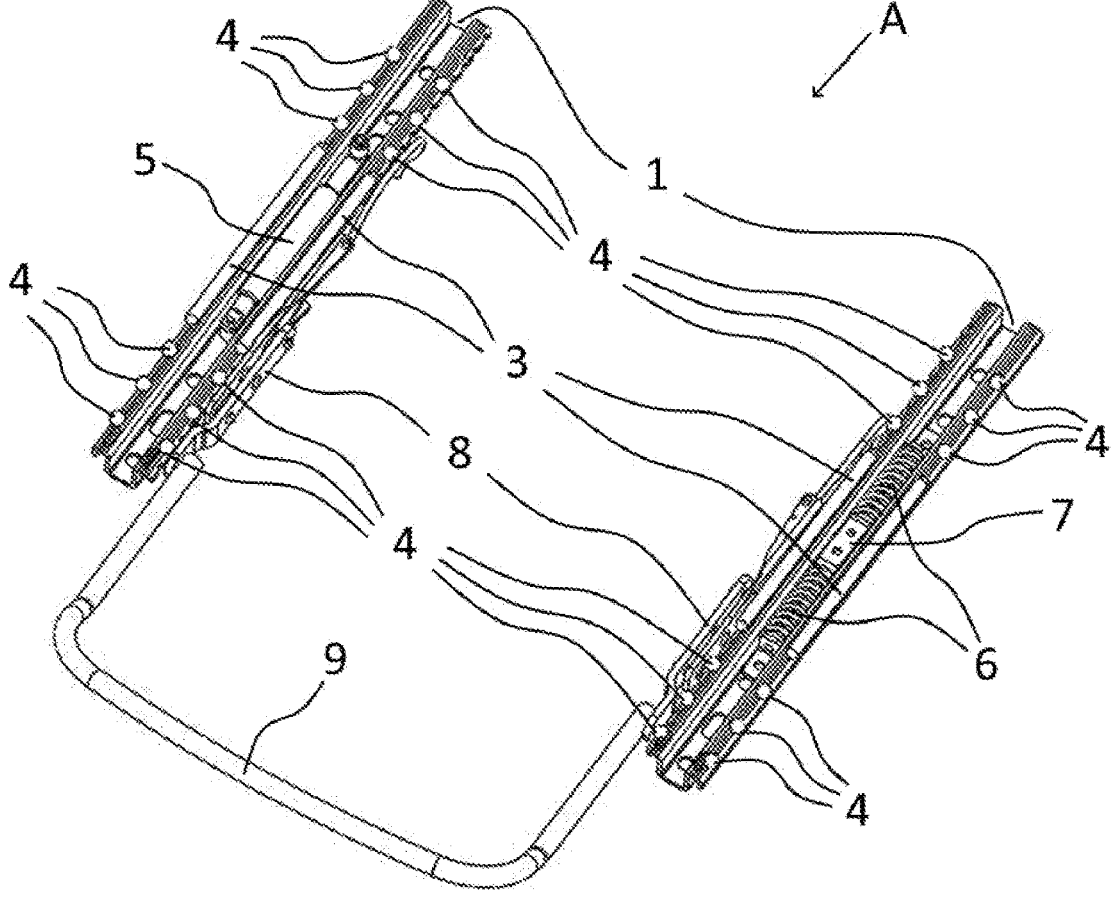
FIG. 3 is a perspective view showing the internal structure of the lateral insulator of the invention.
Figure 4:
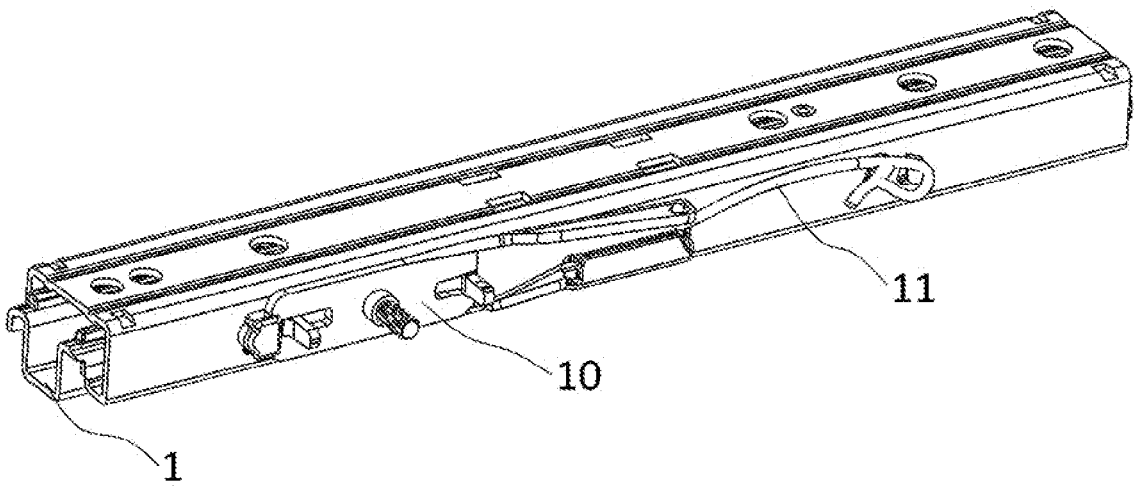
FIG. 4 is a perspective view of the lock mechanism.
Figure 5:
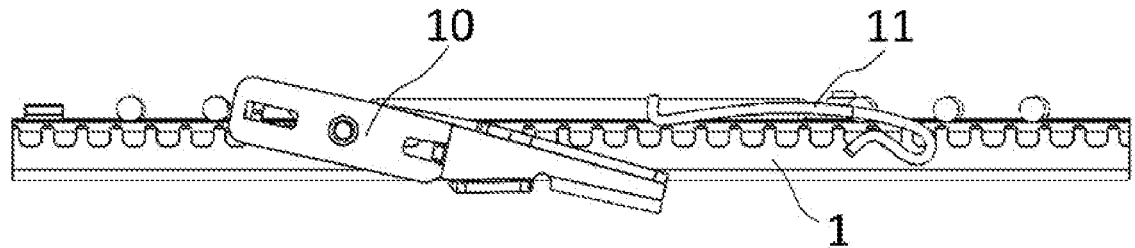
FIG. 5 is a side view of the lock mechanism.

1. Lower rail
2. Upper rail
3. Rail bar
4. Rolling element
5. Shock absorber
6. Spring
7. Balance apparatus
8. Lock mechanism
9. Lock lever
10. Lock sheet
11. Lock spring
A. Lateral insulator
B. Seat suspension system
C. Seat bench

DETAILED DESCRIPTION OF INVENTION

In this detailed description, the preferred embodiments of the lateral insulator (A), which is the subject matter of the invention, are described only for a better understanding of the subject matter.

The lateral isolator (A) of the invention is used by mounted between the driver's seat bench (C) and the seat suspension system (B) in vehicles. The position where the lateral isolator (A) is used is shown in FIG. 1. The lateral isolator (A) basically comprises lower rails (1), upper rails (2), rail bars (3), rolling elements (4), shock absorber (5), spring (6), balance apparatus (7) and lock mechanism (8) to enable the lateral isolator (A) to be activated or deactivated as required and the lock lever (9) connected to the lock mechanism (8).

Two lower rails (1) are mounted horizontally and parallel to each other on the seat suspension system (B) in the vehicle. At the base of the seat bench (C) in the vehicle, two upper rails (2) are mounted horizontally and parallel to each other. The lower rails (1) and the upper rails (2) are positioned to close on each other when the seat bench (C) is seated on the seat suspension system (B). Between the lower rails (1) and the upper rails (2) are rail bars (3) and rolling elements (4). The rolling element (4) is preferably a ball and at least one, preferably twelve, pieces are used between a lower rail (1) and an upper rail (2). Preferably two rail bars (3) are used between the lower rails (1) and the upper rails (2). The rail bars (3) enable the lower rails (1) and the upper rails (2) to move linearly on each other. The rolling elements (4) between the lower rails (1) and the upper rails (2) ensure that the friction generated during the movement of the rails on each other is reduced and the rails can move on each other.

The lateral isolator (A) of the invention comprises two lower rails (1) and an upper rail (2) closed on each other. The lateral isolator (A) is provided with a shock absorber (5) between a lower rail (1) and an upper rail (2), preferably with two springs (6) between the other lower rail (1) and the upper rail (2), and a balance apparatus (7) between the springs (6). The shock absorber (5) provides for limiting and stabilising the movement between the lower rails (1) and the upper rails (2). Likewise, the spring (6) and the balance apparatus (7) also provide for limiting and stabilising the movement between the lower rails (1) and the upper rails (2). The balance apparatus (7) also provides the connection of the springs (6) to the lower rail (1) and stabilises the movement of the rails (6).

In the lateral isolator (A) of the invention, between the lower rail (1) and the upper rail (2) groups positioned parallel to each other, there is a lock mechanism (8) mounted on the groups. The lock mechanism (8) enables the lateral isolator (A) to be activated or deactivated as required. The lock mechanism (8) is activated by the driver's up and down movement of a lock lever (9) connected to it.

The lock mechanism (8) will be controlled by the lock lever (9), which ensures the joint operation of the lateral isolator (A) mechanism. When the lock lever (9), which connects the upper rails (2), is pulled up, the lock mechanism (8) is active, and when the lock lever (9) is lowered, the lock mechanism (8) is locked. In the locking system, which is connected to the lower rail (1) and upper rail (2) from the inner side regions, when the lock lever (9) is lifted up, the teeth at the end of the lock sheet (10) are released and the system becomes active. When the lock lever (9) is lowered down, the thread regions overlap with the threads on the lower rail (1) and lock the lock mechanism (8). The lock spring (11) ensures that the elements forming the lock mechanism (8) stay together.

The invention claimed is:

1. A lateral isolator used by mounting between a seat bench and a seat suspension system in vehicles in order to minimize the discomfort caused by prolonged sitting position and vehicle vibration and to ensure that the driver is minimally affected by road conditions in the seats used in vehicles, on rough roads or under harsh working conditions, the lateral isolator comprising:

lower rails mounted horizontally and parallel to each other on the seat suspension system;

upper rails movable linearly on the lower rail, mounted horizontally and parallel to each other at the base of the seat bench;

rail bars positioned between the lower rails and the upper rails to enable the lower rails and the upper rails to move linearly on each other;

at least one rolling element positioned between the lower rails and the upper rails to reduce the friction generated during the movement of the lower rails and the upper rails on each other and to enable the rails to move on each other;

a shock absorber positioned between the lower rail and the upper rail, and which provides balance by limiting the movement between the lower rails and the upper rails;

two springs positioned between the lower rail and the upper rail, and which provide balance by limiting the movement between the lower rails and the upper rails; and a balance apparatus positioned between the springs for connecting the springs to the lower rail in order to balance the movement of the rails.

2. The lateral isolator according to claim 1, wherein the rolling element is a ball.

3. The lateral isolator according to claim 1, comprising a lock mechanism mounted on the groups between the lower rail and the upper rail groups positioned parallel to each other to enable the lateral isolator to be activated or deactivated as required.

4. The lateral isolator according to claim 3, comprising a lock lever for engaging the lock mechanism.

\* \* \* \* \*